(12) United States Patent
Filanovsky et al.

(10) Patent No.: US 6,811,513 B1
(45) Date of Patent: Nov. 2, 2004

(54) MULTI-SPEED POWER TRANSMISSION

(75) Inventors: Anatoly Filanovsky, Farmington Hills, MI (US); Leonid Basin, Farmington Hills, MI (US)

(73) Assignee: General Motors Corporation, Detroit, MI (US)

(*) Notice: Subject to any disclaimer, the term of this patent is extended or adjusted under 35 U.S.C. 154(b) by 13 days.

(21) Appl. No.: 10/414,162

(22) Filed: Apr. 15, 2003

(51) Int. Cl.$^7$ ................................................ F16H 3/62
(52) U.S. Cl. ...................... 475/284; 475/278; 475/285
(58) Field of Search .............................. 475/271, 275, 475/278, 284, 285, 296

(56) References Cited

U.S. PATENT DOCUMENTS 5,518,465 A * 5/1996 Hiraiwa ...................... 475/275
6,558,287 B2 * 5/2003 Hayabuchi et al. ......... 475/271
6,669,596 B1 * 12/2003 Sefcik .......................... 475/278

FOREIGN PATENT DOCUMENTS

JP          2003-202057    *  7/2003

* cited by examiner

Primary Examiner—Ha Ho
(74) Attorney, Agent, or Firm—Leslie C. Hodges

(57) ABSTRACT

A power transmission has a compound input gearset, a Ravigneaux gearset, five friction type torque-transmitting mechanisms, and a one-way type torque-transmitting mechanism selectively engageable to provide at least six forward speed ratios and one reverse speed ratio for the transmission. The input gearset includes a planet carrier, which is stationary within a transmission housing and connected with a stationary portion of the transmission housing. The planet carrier also includes a central support member which provides nonrotatable housings for the apply pistons for three of the friction type torque-transmitting mechanisms.

5 Claims, 4 Drawing Sheets

SEVEN SPEED

| GEAR STATE | GEAR RATIO | RATIO STEP | CLUTCHING ELEMENTS (NAME/TYPE) | | | | | |
|---|---|---|---|---|---|---|---|---|
| | | | 44 | 46 | 48 | 50 | 52 | 54 |
| REV | 3.05 | | X | | | X | | |
| N | | | | | | | | |
| 1st | 4.49 | | X | | | | | |
| 2nd | 2.58 | 1.74 | | | X | X | | |
| 3rd | 1.537 | 1.68 | | | X | | X | |
| 4th | 1.37 | 1.12 | X | | X | | | |
| 5th | 1.0 | 1.37 | | | X | | | X |
| 6th | 0.842 | 1.19 | X | | | | | X |
| 7th | 0.66 | 1.27 | | | | | X | X |

X = ACTIVE TTM

*FIG. 7*

SIX SPEED

| GEAR STATE | GEAR RATIO | RATIO STEP | CLUTCHING ELEMENTS (NAME/TYPE) | | | | | |
|---|---|---|---|---|---|---|---|---|
| | | | 44 | 46 | 48 | 50 | 52 | 54 |
| REV | 3.05 | | X | | | X | | |
| N | | | | | | | | |
| 1st | 4.49 | | X | | | | | |
| 2nd | 2.58 | 1.74 | | | X | X | | |
| 3rd | 1.537 | 1.68 | | | X | | X | |
| 4th | 1.0 | 1.54 | | | X | | | X |
| 5th | 0.842 | 1.19 | X | | | | | X |
| 6th | 0.66 | 1.27 | | | | | X | X |

X = ACTIVE TTM

*FIG. 8*

MULTI-SPEED POWER TRANSMISSION

TECHNICAL FIELD

This invention relates to multi-speed power transmissions and, more particularly, to multi-speed planetary type power transmissions providing six and seven forward speed ratios.

BACKGROUND OF THE INVENTION

Passenger vehicles include a powertrain that is comprised of an engine, multi-speed transmission, and a differential or final drive mechanism. The multi-speed transmission increases the overall operating range of the vehicle by permitting the engine to operate through its torque range a number of times as the transmission ratios are interchanged. The number of forward speed ratios that are available in a transmission determines the number of ratio interchanges that can occur and therefore the number of times the engine torque range can be repeated.

Early automatic transmissions had two speed ranges. This severely limited the overall speed range of the vehicle and therefore required a relatively large engine that could produce a wide speed and torque range. This resulted in the engine operating at a specific fuel consumption point, during cruising, other than the most efficient point. Therefore, manually shifted (countershaft transmissions) were the most popular.

With the advent of three and four speed automatic transmissions, the automatic shifting (planetary gear) transmission increased in popularity with the motoring public. These transmissions improve the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to five and even six speeds. This has been accomplished in many heavy truck powertrains. Six speed transmissions are disclosed in U.S. Pat. No. 4,070,927 issued to Polak on Jan. 31, 1978; U.S. Pat. No. 5,106,352 issued to Lepelletier on Apr. 21, 1992; U.S. Pat. No. 5,599,251 issued to Beim and McCarrick on Feb. 4, 1997; U.S. Pat. No. 6,071,208 issued to Koivunen on Jun. 6, 2000; U.S. Pat. No. 6,083,135 issued to Baldwin et al. on Jul. 4, 2000; and European Patent Application No. EP 1 033 510 A1 published Jun. 9, 2000.

Six speed transmissions offer several advantages over four and five speed transmissions, including improved vehicle acceleration and improved fuel economy. While many trucks employ six-speed transmissions, such as Polak, passenger cars are still manufactured, for the main part, with three and four speed automatic transmissions, and relatively few five or six speed devices due to the size and complexity of these transmissions. The Polak transmission provides six forward speed ratios with three planetary gearsets, two clutches, and three brakes. The Koivunen and Beim patents utilize six torque transmitting devices including four brakes and two clutches to establish the six forward speed ratios and one reverse ratio. The Lepelletier and the EP publications each employ three planetary gearsets, three clutches and two brakes to provide six forward speed ratios and one reverse ratio. One of the planetary gearsets in each of these publications is positioned and operated to establish two fixed speed input members for the remaining two planetary gearsets.

SUMMARY OF THE INVENTION

It is an object of the present invention to provide an improved multi-speed planetary transmission.

In one aspect of the present invention, an input gearset and a multi-speed Ravigneaux gearset are combined to provide at least six forward speed ratios.

In another aspect of the present invention, the input gearset provides a reduced speed input to the Ravigneaux planetary gearset during at least two of the forward drive ratios and one reverse drive ratio.

In yet another aspect of the present invention, the input gearset has a fixed planet carrier member, which is secured to a transmission housing.

In still another aspect of the present invention, a housing or center support is secured to the fixed planet carrier member of the input gearset.

In yet still another aspect of the present invention, the center support slidably supports piston members for three rotary type torque-transmitting mechanisms.

In a further aspect of the present invention, the center support also provides an outer race for a one-way torque-transmitting mechanism.

In a still further aspect of the present invention, the Ravigneaux planetary gearset includes two interconnected ring gear members, which are also interconnected continuously with a transmission output shaft.

In a yet further aspect of the present invention, the input gearset has a sun gear member, which is continuously driven by a transmission input.

In a still further aspect of the present invention, the power transmission incorporates five friction type torque-transmitting mechanisms and one one-way type torque-transmitting mechanism, which are active in combinations of two to provide at least six forward speed ratios between a transmission input shaft and a transmission output shaft.

In a yet still further aspect of the present invention, the torque-transmitting mechanisms are also effective in combinations of two to establish seven forward speed ratios and one reverse speed ratio between the transmission input shaft and the transmission output shaft.

DESCRIPTION OF THE DRAWINGS

FIG. 7 is a chart depicting the engagement sequence of the torque-transmitting mechanisms of the transmission shown in FIG. 1 to provide seven forward speed ratios and one reverse speed ratio.

FIG. 8 is a chart depicting the engagement sequence of the torque-transmitting mechanisms to provide six forward speed ratios and one reverse speed ratio in the transmission shown in FIG. 1.

DESCRIPTION OF AN EXEMPLARY EMBODIMENT

Figure 1:
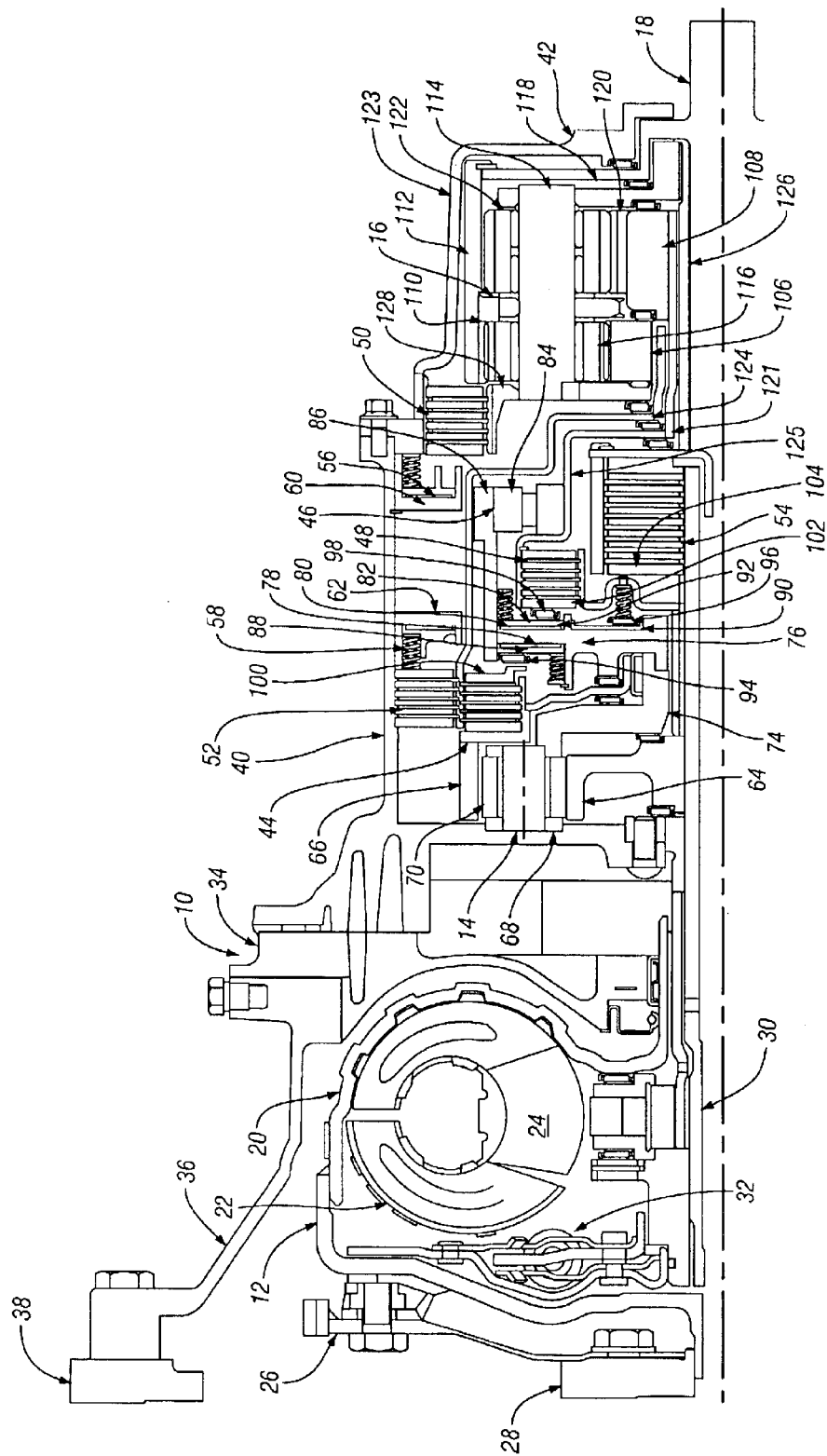
FIG. 1 is a cross-sectional elevational view of a power transmission incorporating the present invention.
Figure 2:
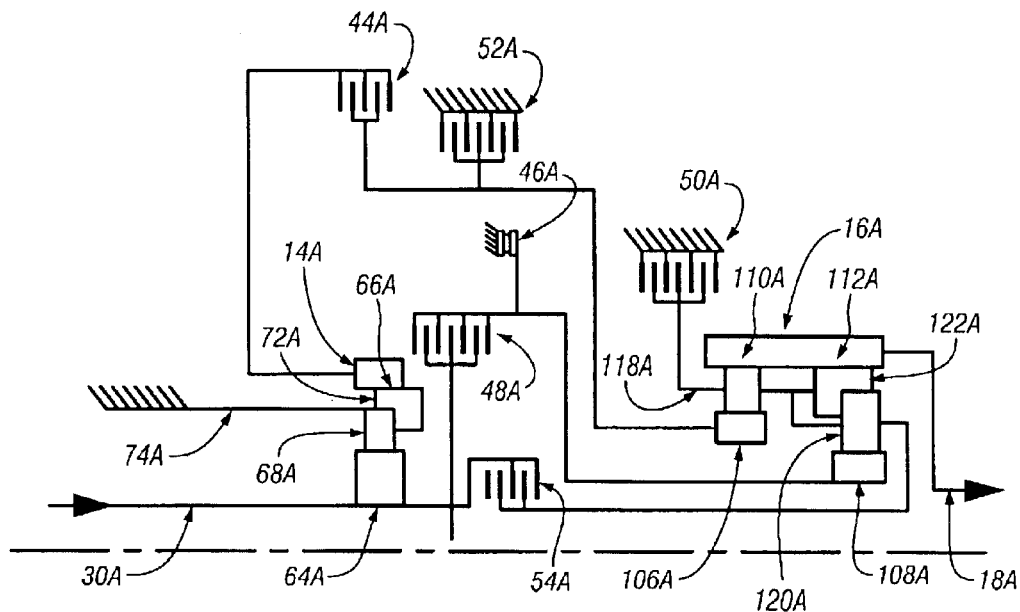
FIG. 2 is a schematic representation of the power transmission shown in FIG. 1.
Figure 3:
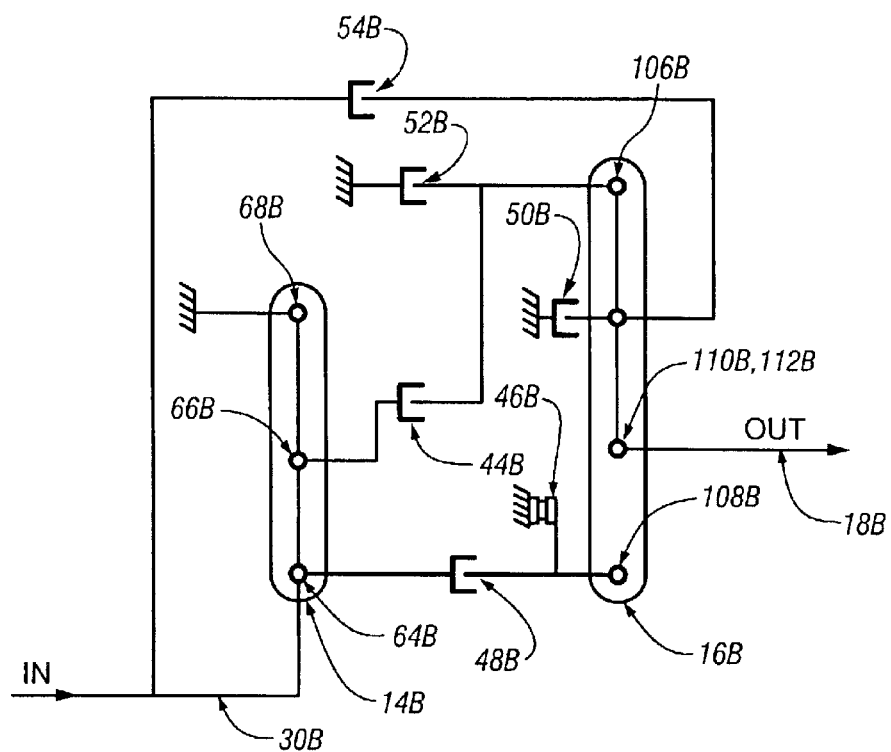
FIG. 3 is a lever diagram representing the power transmission shown in FIGS. 1 and 2.

Referring to the drawings, wherein like characters represent the same or corresponding parts throughout the several views, there is seen in FIG. 1 a power transmission 10 having a torque converter 12, an input planetary gearset 14, a Ravigneaux planetary gearset 16, and an output shaft 18.

The torque converter 12 includes an impeller 20, a turbine 22, and a stator 24. The torque converter 12 is a conventional hydrodynamic device, the construction and operation of which is well known to those skilled in the art. The impeller 20 is connected with a flex plate or input member 26, which is secured to an engine crankshaft 28.

The turbine 22 is drivingly connected with a transmission input shaft 30. A conventional torque converter clutch 32 is arranged between the impeller 20 and the turbine 22. As is well known, the torque converter clutch 32 is engageable and disengageable to eliminate the slippage of the torque converter during certain operation of the transmission. Preferably, the torque converter clutch is engaged when the engine speed is at a sufficiently high value to reduce the torsional vibrations, which might otherwise be present.

The transmission 10 also includes a stationary housing 34 which has a front cover or bell housing 36 connected with an engine 38, a central housing portion 40, and a rear cover 42. The power transmission 10 also includes six torque-transmitting mechanisms 44, 46, 48, 50, 52, and 54. The torque-transmitting mechanism 46 is a one-way type torque-transmitting mechanism, the construction and operation of which is well known in the art of power transmissions.

The torque-transmitting mechanisms 50 and 52 are stationary type torque-transmitting mechanisms, commonly termed brakes. These torque-transmitting mechanisms 50 and 52 are conventional multi-disc friction brakes which each includes a respective actuating piston 56 and 58. The piston 56 is slidably housed in a cylinder 60, which is secured to the housing 40, and the piston 58 is slidably disposed in a cylinder 62, which is secured in the housing 40. The friction plates for the torque-transmitting mechanism 50 are disposed within the cover 42. The torque-transmitting mechanisms 44, 48, and 54 are rotating type torque-transmitting mechanisms, commonly termed clutches.

Figure 4:
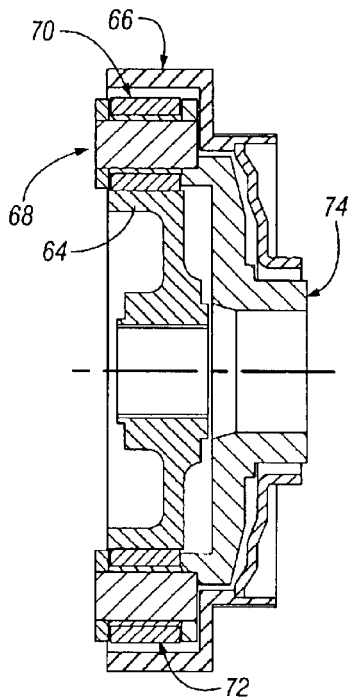
FIG. 4 is an assembly view of the input gearset for the power transmission shown in FIG. 1.
Figure 5:
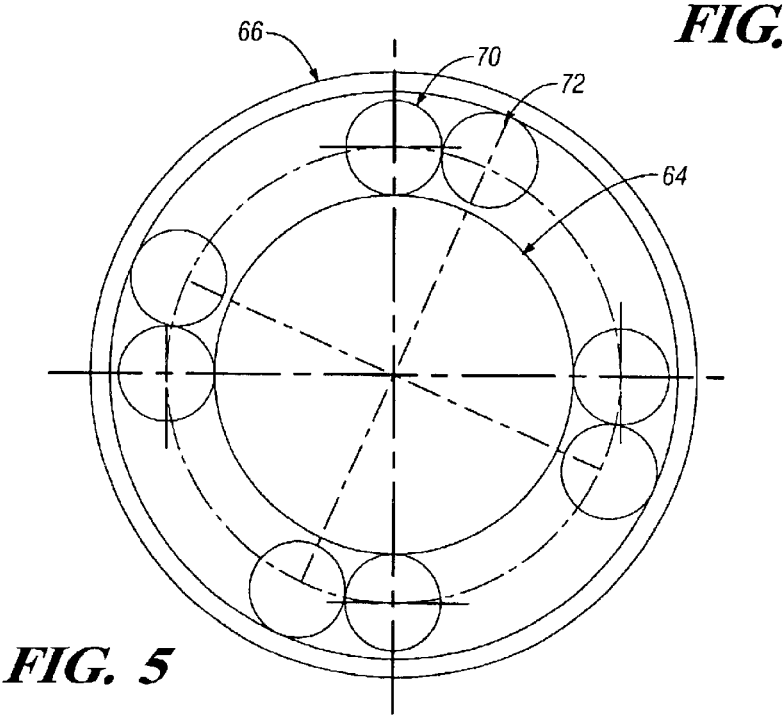
FIG. 5 is a view taken along line 5—5 of FIG. 4.

The input planetary gearset 14, as best seen in FIGS. 1, 4, and 5, includes a sun gear member 64, a ring gear member 66, and a planet carrier assembly member 68. The planet carrier assembly member 68 has a plurality of intermeshing pinion gears 70 and 72, which are rotatably disposed on a planet carrier member 74 and meshing with the sun gear member 64 and ring gear member 66, respectively. The construction of the planet carrier assembly member 68 is best seen in FIGS. 4, 5, and 6.

Figure 6:
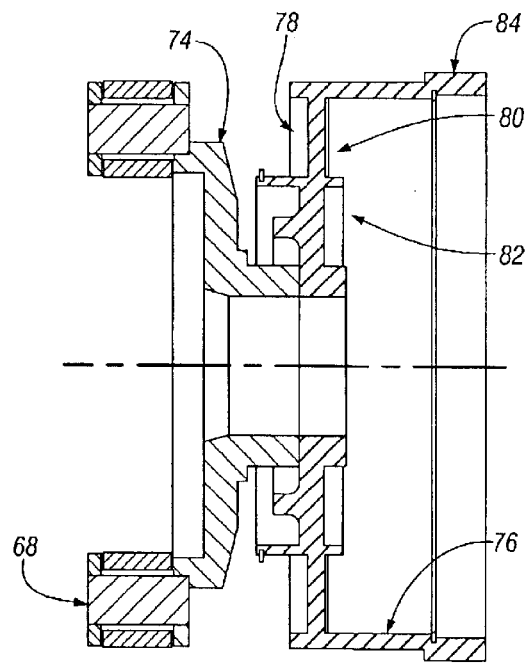
FIG. 6 is an assembly view of the planet carrier assembly and support housing used in the power transmission shown in FIG. 1.

As seen in FIG. 6, the planet carrier member 74 has secured thereto a central support member 76. The central support member 76 has three annular cavities or cylinders 78, 80, and 82 formed therein. Also, found on the support member 76 is an extension or hub 84. The hub 84 has secured thereto an outer race 86 for the one-way torque-transmitting mechanism 46.

The torque-transmitting mechanism 44 has an apply piston 88 slidably disposed in the cylinder 78. The piston 88 is nonrotatably supported within the central support 76. An apply piston 90 is slidably disposed within the cylinder 80. The apply piston 90 is nonrotatable within the cylinder 80. An apply piston 92 is nonrotatably slidably disposed within the cylinder 82. Each of the pistons 88, 90, and 92 has adjacent thereto respective needle bearings 94, 96, and 98. These needle bearings 94, 96, and 98 are disposed for abutment with apply plates 100, 102, and 104, respectively.

The cylinders 78, 80, and 82 and their respective pistons 88, 90, and 92 cooperate to form apply chambers on the central support 76. These apply chambers are connected with the hydraulic system, not shown, which permit the chambers to be pressurized hydraulically by a conventional electro-hydraulic control mechanism. As each of the respective chambers is energized or pressurized, the respective pistons 78, 80, and 82 will move axially to enforce engagement of the respective torque-transmitting mechanisms 44, 48, and 54. This action is well known within the art of power transmissions.

It should be noted from the above discussion, that each of the torque-transmitting mechanisms 44, 48, 50, 52, and 54 are engaged by pistons that are nonrotatable within the transmission housings. Thus, the systems do not require, at least for the rotating type torque-transmitters, the centrifugal balance since the apply chambers for each of these torque-transmitting mechanisms is nonrotatable. As is well known, this will simplify the electronic control mechanisms for the transmission.

The Ravigneaux planetary gearset 16 includes two sun gear members 106 and 108, two ring gear members 10 and 112, and a planet carrier assembly member 114. The planet carrier assembly member 114 has a plurality of pinion gears 116 meshing between the sun gear member 106 and the ring gear member 110 and being rotatably supported on a planet carrier member 118. A plurality of intermeshing pinion gears 120 and 122 are also rotatably supported on the planet carrier member 118 and disposed in meshing relationship with each other and with the sun gear member 108 and ring gear member 112, respectively.

The ring gear members 110 and 112 are continuously interconnected and can be formed on a hub 123, which is drivingly continuously connected with the transmission output shaft 18. The sun gear member 108 is connected through a sleeve shaft 121 and hub 125 with the one-way torque-transmitting mechanism 46. The hub 125 is also connected with a portion of the torque-transmitting mechanism 48. The sun gear member 106 is connected through a hub or housing 124 with both the torque-transmitting mechanisms 44 and 52.

The planet carrier member 118 is drivingly connected through a shaft 126 with the torque-transmitting mechanism 54. The planet carrier member 118 is also operatively connected with the torque-transmitting mechanism 50 through a side plate 128.

The input shaft 30 is, as previously mentioned, continuously connected with the sun gear member 64 and also drivingly connected with both the torque-transmitting mechanisms 48 and 54. The ring gear member 66 is operatively connected with the torque-transmitting mechanism 44.

As most easily seen in FIGS. 2, 3, 7, and 8, the torque-transmitting mechanisms 44, 46, 48, 50, 52, and 54 are established in combinations of two to provide either seven forward speed ratios and one reverse speed ratio or six forward speed ratios and one reverse speed ratio between the transmission input shaft 30 and the transmission output shaft 18. The components of FIG. 2 have the same numerical designation with an "A" suffix as their corresponding components in FIG. 1. The nodes and torque-transmitting mechanisms shown in FIG. 3 with the lever diagram have the same corresponding numerical designations with a "B" suffix as their corresponding components of FIG. 1.

As seen in FIG. 8, the torque-transmitting mechanisms can be engaged in combinations of two to provide six forward speed ratios and a reverse speed ratio. The chart of FIG. 8 also provides an example of the numerical values of the speed ratios as well as the step ratio between adjacent forward speed steps. It can be determined from the chart of FIG. 8 that the input gearset 14 is active in the reverse speed ratio, the first forward speed ratio, and the fifth forward speed ratio. During the second, third, fourth, and sixth forward speed ratios, the input gearset 14 is bypassed and the Ravigneaux gearset 16B is input either through the planet carrier member 118A or through the sun gear member 108. When the input gearset 14 is active, the transmission power is input through the sun gear member 106.

The chart of FIG. 7 describes the combinations of torque-transmitting mechanism engagement to establish seven forward speed ratios and one reverse speed ratio between the input shaft 30 and the output shaft 18. When compared with FIG. 8, the combinations of engagement in FIG. 7 include an additional underdrive ratio, which is designated as the fourth forward speed ratio in FIG. 7. Note that this numerical value is between the third ratio and fourth ratio of FIG. 8.

The remaining ratios of the seven speed power transmission, that is, reverse, first, second, third, fifth, sixth, and seventh are the same as the six forward speed ratios in FIG. 8 and the reverse speed ratio of FIG. 8. When a seven speed scheme is employed, the input gearset 14A is active in three forward speed ratios and one reverse speed ratio.

The above described invention is a unique architecture that provides either a six or seven speed automatic transmission. The power flow scheme of the above-described transmission includes a Ravigneaux planetary gearset and a compound planetary gearset. The compound planetary gearset is an input gearset, as described above, for at least two forward speeds and one reverse speed, and the Ravigneaux planetary gearset is active in all of the forward speed ratios and reverse speed ratio. It should also be apparent to those skilled in the art that both of the six speed and seven speed power layouts include a direct or 1:1 ratio.

A significant characteristic of the subject power transmission is the employment of a stationary input planet carrier. The use of a stationary input planet carrier reduces the misalignment of the gearset and the need to balance the carrier. As is well known, the rotating carrier in planetary gearsets must be balanced in order to eliminate vibration. Also, the present transmission construction has a continuously driven input sun gear member, which further improves the noise reduction for the planetary transmission.

The unique center support 76, which is integral with the planet carrier member, provides the stationary support for three of the pistons 88, 90, and 92 of the rotating type torque-transmitting mechanisms 44, 48, and 54, respectively, as well as support for the one-way torque transmitting mechanism 46. The center support also provides the rotary support for the ring gear member 66 of the input planetary gearset 14. The piloting of the ring gear member on the center support further improves the operating efficiency and noise reduction within the power transmission.

The present invention provides a transmission architecture that is compact in overall length and weight and provides improved packaging of many of the transmission elements. These features provide for reduced noise and vibration within the transmission as well as increased overall efficiency of the transmission and the vehicle in which the transmission is incorporated.

What is claimed is:

1. A power transmission comprising:
   an input shaft;
   an output shaft;
   a transmission housing;
   a first planetary gearset including a sun gear member continuously connected with said input shaft, a planet carrier assembly member having a plurality of intermeshing pinion gear members rotatably supported on a carrier member that is continuously connected with said transmission housing, and a ring gear member, said sun gear member meshing one of said meshing pinion gear members and said ring gear member meshing with the other of said meshing pinion gear members;

a second planetary gearset including first and second sun gear members, first and second interconnected ring gear members, a planet carrier assembly member having a first pinion gear member meshing with both said first sun gear member and said first ring gear member, a second planetary gear member meshing with said second sun gear member, a third planetary gear member meshing with both said second planetary gear member and said second ring gear member and a planet carrier member rotatably supporting said first, second, and third planetary gear members, and said first and second ring gear members being continuously connected with said output shaft;

a first torque-transmitting mechanism selectively connectible between said ring gear member of said first planetary gearset and said first sun gear member of said second planetary gearset;

a second torque-transmitting mechanism selectively connectible between said second sun gear member of said second planetary gearset and said transmission housing;

a third torque-transmitting mechanism selectively connectible between said input shaft and said second sun gear member of said second planetary gearset;

a fourth torque-transmitting mechanism selectively connectible between said transmission housing and said carrier member of said second planetary gearset;

a fifth torque-transmitting mechanism selectively connectible between said transmission housing and said first sun gear member of said second planetary gearset; and a sixth torque-transmitting mechanism selectively connectible between said input shaft and said carrier member of said second planetary gearset.

2. The power transmission defined in claim 1 further wherein:
   said torque-transmitting mechanisms are selectively engageable in combinations of two to establish seven forward speed ratios and one reverse speed ratio between said input shaft and said output shaft.

3. The power transmission defined in claim 1 further wherein:
   said torque-transmitting mechanisms are selectively engageable in combinations of two to establish six forward speed ratios and one reverse speed ratio between said input shaft and said output shaft.

4. The power transmission defined in claim 1 further wherein:
   said fifth torque-transmitting mechanism being a one-way torque-transmitting mechanism.

5. The power transmission defined in claim 1 further wherein:
   said planet carrier member of said first planetary gearset includes a central support housing secured therewith wherein said central support housing provides stationary or nonrotatable cavities for apply pistons for each of said first, third, and sixth torque-transmitting mechanisms.

\* \* \* \* \*